US008908106B2

(12) United States Patent
Mori

(10) Patent No.: US 8,908,106 B2
(45) Date of Patent: Dec. 9, 2014

(54) MOBILE TERMINAL

(75) Inventor: Masaki Mori, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 210 days.

(21) Appl. No.: 13/460,889

(22) Filed: May 1, 2012

(65) Prior Publication Data
US 2012/0281149 A1 Nov. 8, 2012

(30) Foreign Application Priority Data
May 2, 2011 (JP) ................. 2011-103124

(51) Int. Cl.
H04N 5/44 (2011.01)
H04N 21/81 (2011.01)
H04N 21/443 (2011.01)
H04N 21/422 (2011.01)
H04N 21/41 (2011.01)

(52) U.S. Cl.
CPC ...... H04N 21/8173 (2013.01); H04N 21/42224 (2013.01); H04N 21/4436 (2013.01); H04N 21/4126 (2013.01)
USPC ........... 348/734; 348/719; 348/723; 348/725; 348/729; 348/730; 348/731; 348/636; 348/680; 348/693; 348/563; 348/569; 348/192; 348/14.02; 348/14.04; 348/14.05; 348/14.12; 725/33; 725/37; 725/38; 725/39; 725/40; 725/44; 725/131; 725/133; 725/139; 725/151; 715/700; 715/737; 715/740; 715/741; 715/747

(58) Field of Classification Search
USPC ................. 348/734, 719, 725, 729, 730, 731, 348/14.04, 14.05, 192, 723, 563, 636, 680, 348/693, 14.02, 14.12; 725/37, 38, 39, 40, 725/44, 131, 139, 151; 715/700, 737
See application file for complete search history.

(56) References Cited

U.S. PATENT DOCUMENTS

| 5,745,192 A * | 4/1998 | Bialobrzewski ............... 348/734 |
| 7,071,971 B2 * | 7/2006 | Elberbaum ............... 348/211.11 |
| 2002/0054206 A1 * | 5/2002 | Allen .......................... 348/14.04 |
| 2002/0120790 A1 * | 8/2002 | Schwalb ....................... 709/328 |
| 2002/0180894 A1 * | 12/2002 | Okajima et al. ............... 348/734 |
| 2003/0159157 A1 * | 8/2003 | Chan .............................. 725/151 |
| 2004/0214541 A1 * | 10/2004 | Choi ........................... 455/186.1 |
| 2006/0125968 A1 * | 6/2006 | Yokozawa et al. ............ 348/734 |
| 2006/0130093 A1 * | 6/2006 | Feng et al. ...................... 725/39 |

(Continued)

FOREIGN PATENT DOCUMENTS

| JP | 2006-211604 A | 8/2006 |
| JP | 2007-036796 A | 2/2007 |
| JP | 2009-124413 A | 6/2009 |
| JP | 2010-079566 A | 8/2010 |

Primary Examiner — Jefferey Harold
Assistant Examiner — Mustafizur Rahman
(74) Attorney, Agent, or Firm — Morgan, Lewis & Bockius LLP

(57) ABSTRACT

A mobile device stores a TV application for serving as a remote control capable of controlling a TV receiver. The mobile device starts the process of starting the TV application and transmits, to the TV receiver, control signals to turn on the TV receiver before the TV application has been started. More particularly, the mobile device transmits the control signals to turn on the TV receiver while performing the process of starting the TV application. When the mobile device has started the TV application and then the TV receiver has been turned on in normal mode, a user can control the TV receiver by using the mobile device.

4 Claims, 6 Drawing Sheets

(56) References Cited

U.S. PATENT DOCUMENTS

| | | |
|---|---|---|
| 2007/0028085 A1 | 2/2007 | Inohiza |
| 2008/0109729 A1* | 5/2008 | Notea et al. ................... 715/722 |
| 2008/0225184 A1* | 9/2008 | Hardacker et al. ............ 348/734 |
| 2010/0125890 A1* | 5/2010 | Levine et al. ................. 725/131 |
| 2010/0138873 A1* | 6/2010 | Terada et al. .................. 725/56 |
| 2010/0328547 A1* | 12/2010 | Mayorga ....................... 348/734 |
| 2011/0058107 A1* | 3/2011 | Sun et al. ...................... 348/734 |
| 2011/0273625 A1* | 11/2011 | McMahon et al. ............ 348/734 |
| 2011/0304778 A1* | 12/2011 | Roberts et al. ................ 348/734 |

* cited by examiner

MOBILE TERMINAL

BACKGROUND OF THE INVENTION

1. Field of the Invention

The present invention relates to a mobile terminal that can start an application to control an external device.

2. Description of the Related Art

Mobile devices that can expand their functions by starting applications have recently become known. Such a mobile device can work, for example, as a remote control capable of controlling a television (hereinafter referred to as "TV") receiver by starting an application that can control the TV receiver (hereinafter referred to as "TV application").

BRIEF SUMMARY OF THE INVENTION

FIG. 7 shows the time that elapses before the above described mobile device becomes able to work as the remote control. The t-axis in FIG. 7 shows the time axis. The mobile device starts the process of starting the TV application in response to a user request (t101), and completes the process of starting the TV application (t102). Subsequently, when the TV application is operated by a user to turn on the TV receiver (t103), the TV receiver is turned on (t104), and then a user can control the TV receiver by using the mobile device.

As described above, the shortest time before the mobile device serves as the remote control so that it can control the TV receiver is the sum of the time from start to completion of the process of starting the TV application (t101 to t102) and the time from when power-on of the TV receiver is requested until the TV receiver is turned on (t103 to t104). Therefore, a user has to wait at least for the total time described above and thus cannot control the TV receiver quickly.

In this regard, Japanese Laid-open Patent Publication No. 2010-79566 discloses an information processing apparatus and a method of starting an application wherein, when the apparatus is turned on, an application program for a function stored as priority function information is started preferentially, and when the start process is completed, an initial screen for the started function is displayed so that a user can operate it. However, this apparatus and method cannot solve the above described problem.

Japanese Laid-open Patent Publication No. 2009-124413 discloses a broadcast receiving system that, when a user is present in a sensor detection area, starts the processes of start-up of the operating system, initialization of applications, and decoding and that, when no user is present in the detection area, stops the processes. However, this system requires the presence of a user in the detection area and cannot solve the above described problem.

Japanese Laid-open Patent Publication No. 2007-36796 discloses a wireless communication apparatus comprising first storage means for storing a plurality of programs, second storage means used for execution of programs, and operation means for turning on the apparatus and starting a certain application. When start-up of a certain application is requested via the operation means, the apparatus loads a program needed for start-up of the application in the second storage means and executes the program, thereby starting the application. However, this wireless communication apparatus also cannot solve the above described problem.

Further, Japanese Laid-open Patent Publication No. 2006-211604 discloses a TV receiver that, when detecting a memory card mounted in the memory card slot, turns on the main power supply and determines whether or not data content that can be played back using an application is stored in the memory card. If content can be played back, the TV receiver starts the application. However, this TV receiver also cannot solve the above described problem.

An object of the present invention is to provide a mobile terminal that, when starting a control application to control an external device, can reduce the waiting time from when the process of starting the control application is started until the external device can be controlled.

According to the present invention, this object is achieved by a mobile terminal comprising: signal transmission means for transmitting control signals to an external device; operation means for a user to perform various actions; and a microprocessor that starts a control application for control of the external device and, based on the control application, transmits, to the external device, control signals in response to a user action on the operation means by using the signal transmission means.

When starting the control application, the microprocessor transmits, to the external device, control signals to turn on the external device by using the signal transmission means before the control application has been started.

With the above configuration, because the microprocessor transmits, to the external device, control signals to turn on the external device before the control application has been started, the external device can be turned on more quickly as compared to the case where the external device is instructed to be turned on after the control application has been started. This can reduce the waiting time from when the process of starting the control application is started until the external device can be controlled using the control application.

In one embodiment, the external device is a television receiver.

Preferably, control signals transmitted from the signal transmission means are omnidirectional wireless signals.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE INVENTION

Figure 1:
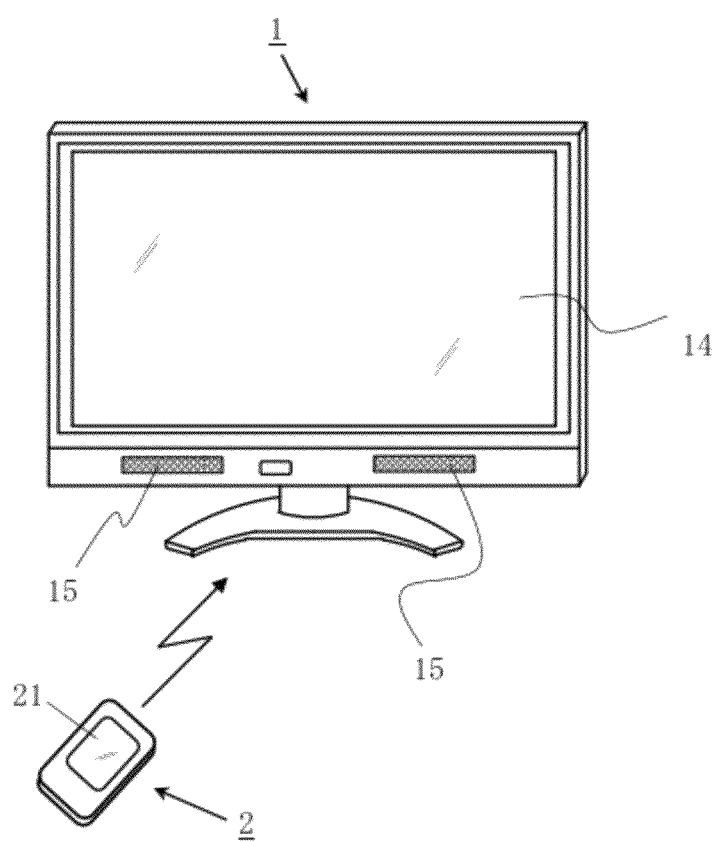
FIG. 1 is a perspective view of a mobile device according to one embodiment of the present invention and a TV receiver.
Figure 2:
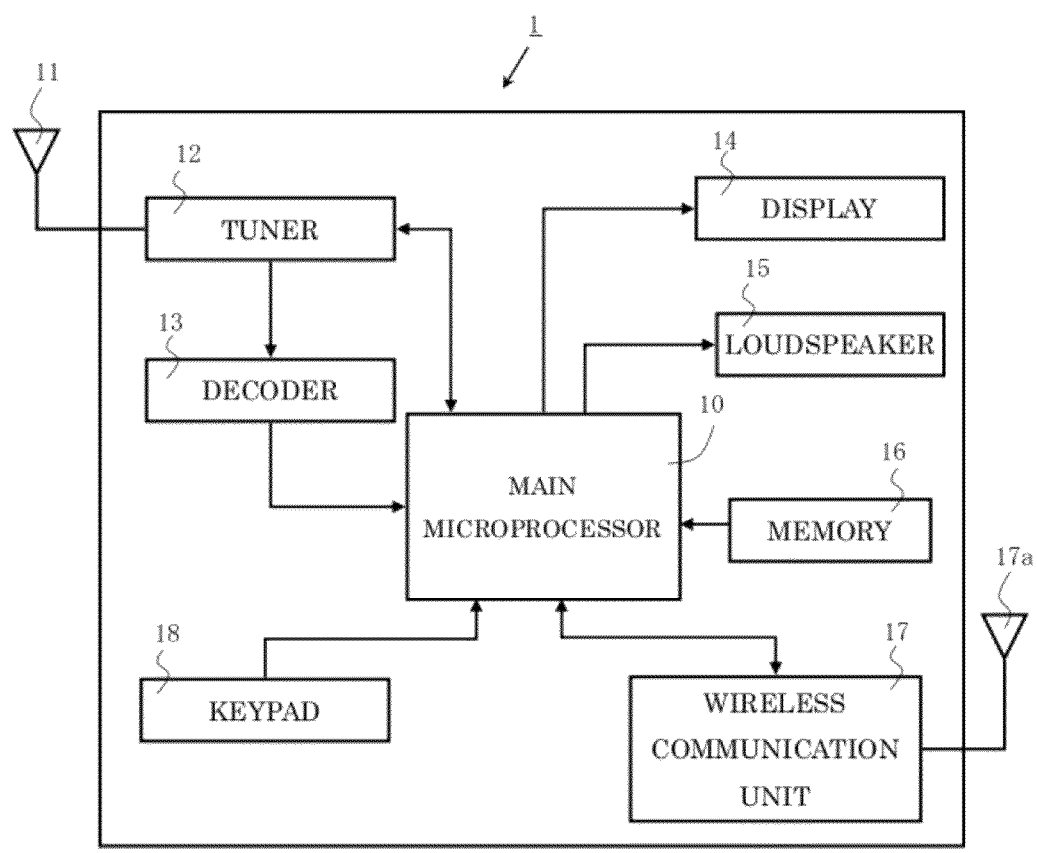
FIG. 2 is a block diagram showing the internal configuration of the TV receiver.
Figure 3:
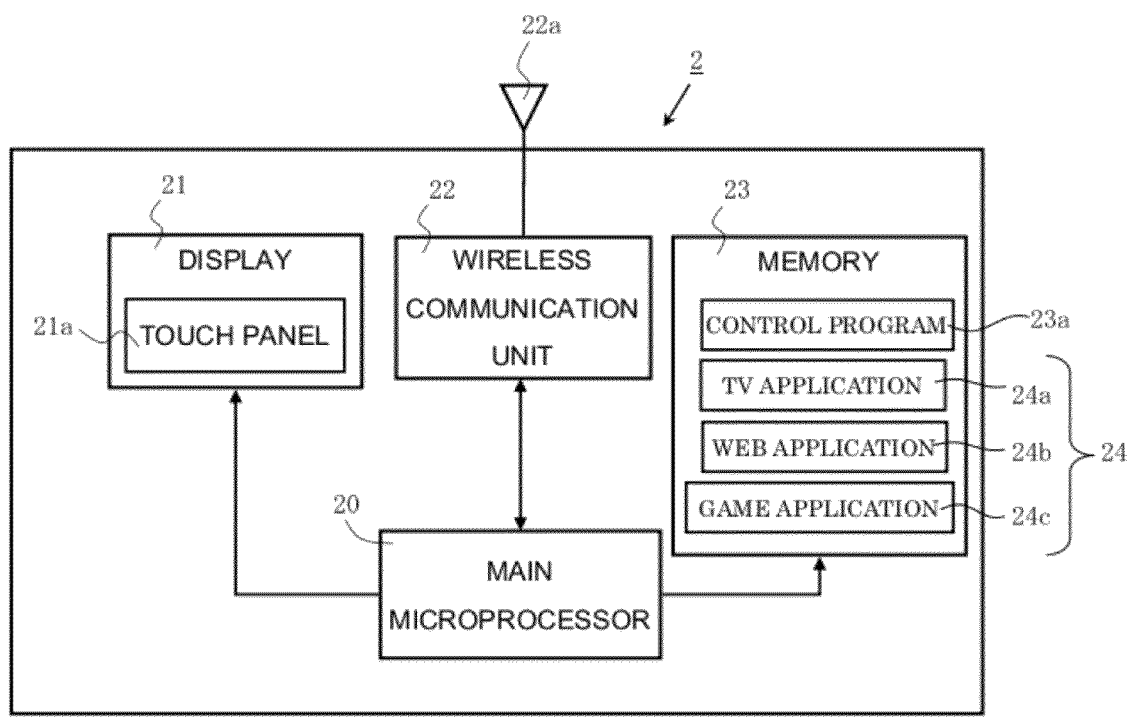
FIG. 3 is a block diagram showing the internal configuration of the mobile device.

Referring now to FIG. 1 to FIG. 3, a mobile device according to one embodiment of the present invention is described. It is to be noted that the following description of preferred embodiment of the present invention has been presented for purposes of illustration and description, and is not intended to be exhaustive or to limit the present invention to the precise form disclosed.

FIG. 1 shows the appearances of a television (TV) receiver (external device) 1 and the mobile device (mobile terminal) 2. FIG. 2 is an electrical block diagram of the TV receiver 1. FIG. 3 is an electrical block diagram of the mobile device 2.

As shown in FIG. 3, the mobile device 2 stores multiple applications 24 including a TV application 24a for enabling the device itself to work as a remote control capable of controlling the TV receiver 1. The mobile device 2 can execute the functions of an application 24 after the process of starting the application 24 is completed. More specifically, for example, after the process of starting the TV application 24a is completed, the mobile device 2 can control the TV receiver 1 by transmitting, to the TV receiver 1, control signals in response to a user action.

As shown in FIG. 2, the TV receiver 1 comprises a tuner 12 that is connected to an antenna 11 and receives digital broadcast signals, a decoder 13, a display 14 that displays images, a loudspeaker 15 that outputs audio, and a memory 16. The TV receiver 1 further comprises a wireless communication unit 17 that receives wireless signals transmitted from the mobile device 2, a keypad 18 having a number of buttons to be operated by a user, and a main microprocessor 10.

The tuner 12 receives digital broadcast signals on each channel distributed from a broadcast station via the antenna 11. The decoder 13 comprises a transport stream (TS) conversion circuit (not shown) that performs processes such as demodulation and error correction for digital broadcast signals received by the tuner 12 and separates needed TS packets from multiplexed signals, and a video decoding circuit (not shown), an audio decoding circuit (not shown), and a data decoding circuit (not shown), which decode separated TS packets, and so on.

The video decoding circuit decodes TS packets containing video signals, extracts the video signals, and outputs the extracted video signals to the main microprocessor 10. The audio decoding circuit decodes TS packets containing audio signals, extracts the audio signals, and outputs the extracted audio signals to the main microprocessor 10.

The data decoding circuit decodes TS packets containing service information (SI) data, extracts the SI data, and outputs the extracted SI data to the main microprocessor 10. The SI data includes an event information table (EIT) in which program information on TV programs is stored.

The display 14 displays video of a TV program received by the tuner 12. The loudspeaker 15 outputs audio of a TV program received by the tuner 12. The memory 16 stores programs used for the operation of the main microprocessor 10.

The wireless communication unit 17 is a communication device for transmitting and receiving wireless signals to and from the mobile device 2 via an antenna 17a. The wireless communication unit 17 serves as a LAN controller that controls a wireless LAN network including the TV receiver 1 and the mobile device 2, and transmits and receives wireless signals based on Wi-Fi standards. The wireless communication unit receives wireless signals transmitted from the mobile device 2 and outputs data (control signals) contained in the wireless packets to the main microprocessor 10.

The main microprocessor 10 has multiple operation modes such as a normal mode for performing normal operation and a standby mode for waiting for a request from a user. In the standby mode, the main microprocessor 10 controls the TV receiver 1 so that the main power supply (not shown) is off while the wireless communication unit 17, the keypad 18, and the function of the main microprocessor 10 that receives signals sent from the wireless communication unit 17 and the keypad 18 are on. When "power on" signals are received by the wireless communication unit 17 in the standby mode, the main microprocessor 10 switches the operation mode to the normal mode.

As shown in FIG. 3, the mobile device 2 comprises a display 21 that displays images, a wireless communication unit (signal transmission means) 22, a memory 23, and a main microprocessor 20. The display 21 has a touch panel (operation means) 21a that serves as operation buttons. A user can perform various actions by touching the touch panel 21a.

The wireless communication unit 22 is a communication device that transmits and receives wireless signals to and from the TV receiver 1 via a non-directional antenna 22a, and serves as a LAN controller that controls a wireless LAN network. The wireless communication unit 22 transmits and receives wireless signals based on Wi-Fi standards.

The memory 23 stores control programs 23a used for the operation of the main microprocessor 20 as well as the multiple applications 24. The multiple applications 24 include the TV application (control application) 24a for controlling the TV receiver 1, a web application 24b for communication over the Internet, and a game application 24c for playing a game.

The main microprocessor 20 controls each component in the mobile device 2, based on a user action on the touch panel 21a. Further, when start-up of an application 24 is requested by a user, the main microprocessor 20 reads the requested application 24 from the memory 23 and starts the read application 24. The main microprocessor 20 then provides functions of the application 24 that has been started. More specifically, for example, when start-up of the TV application 24a is requested, the main microprocessor 20 starts the TV application 24a. After the process of starting the TV application 24a is completed, the main microprocessor 20 transmits control signals in response to a user action on the touch panel 21a via the wireless communication unit 22 to the TV receiver 1 based on remote control functions of the TV application 24a, thereby controlling the TV receiver 1.

Figure 4C:
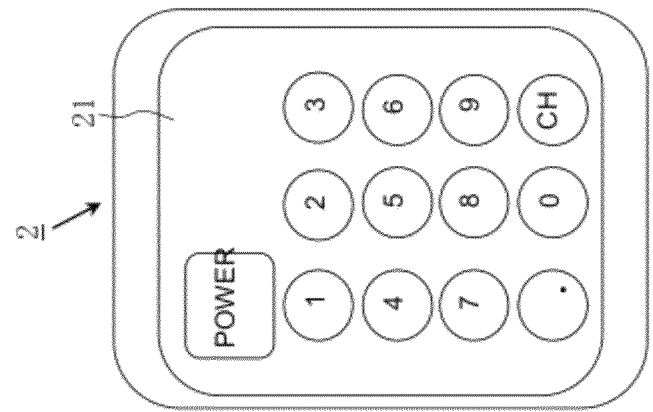
FIGS. 4A to 4C illustrate images displayed on the display of the mobile device when a TV application is started.
Figure 4B:
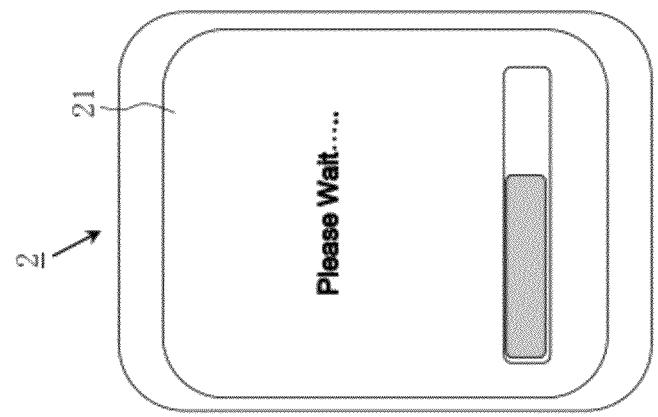
Figure 4A:
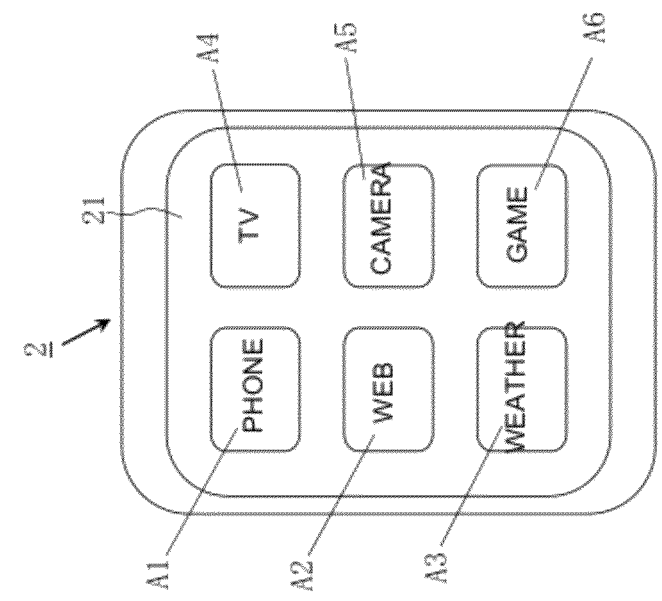

Referring now to FIGS. 4A to 4C, images displayed on the display 21 in the process of starting the TV application 24a by the mobile device 2 are described. FIGS. 4A to 4C illustrate images displayed on the display 21.

As shown in FIG. 4A, before an application 24 to be started is selected, icons A1 to A6 representing operation buttons are shown on the display 21. When a TV icon A4 corresponding to the TV application 24a is selected by a user, the main microprocessor 20 starts the TV application 24a. At this time, as shown in FIG. 4B, a message indicating that the TV application 24a is being started ("Please Wait") is shown on the display 21.

When the TV application 24a has been started, the main microprocessor 20 displays an operation screen having a number of operation button images on the display 21 as shown in FIG. 4C. A user can control the TV receiver 1 by touching these button images.

Figure 5:
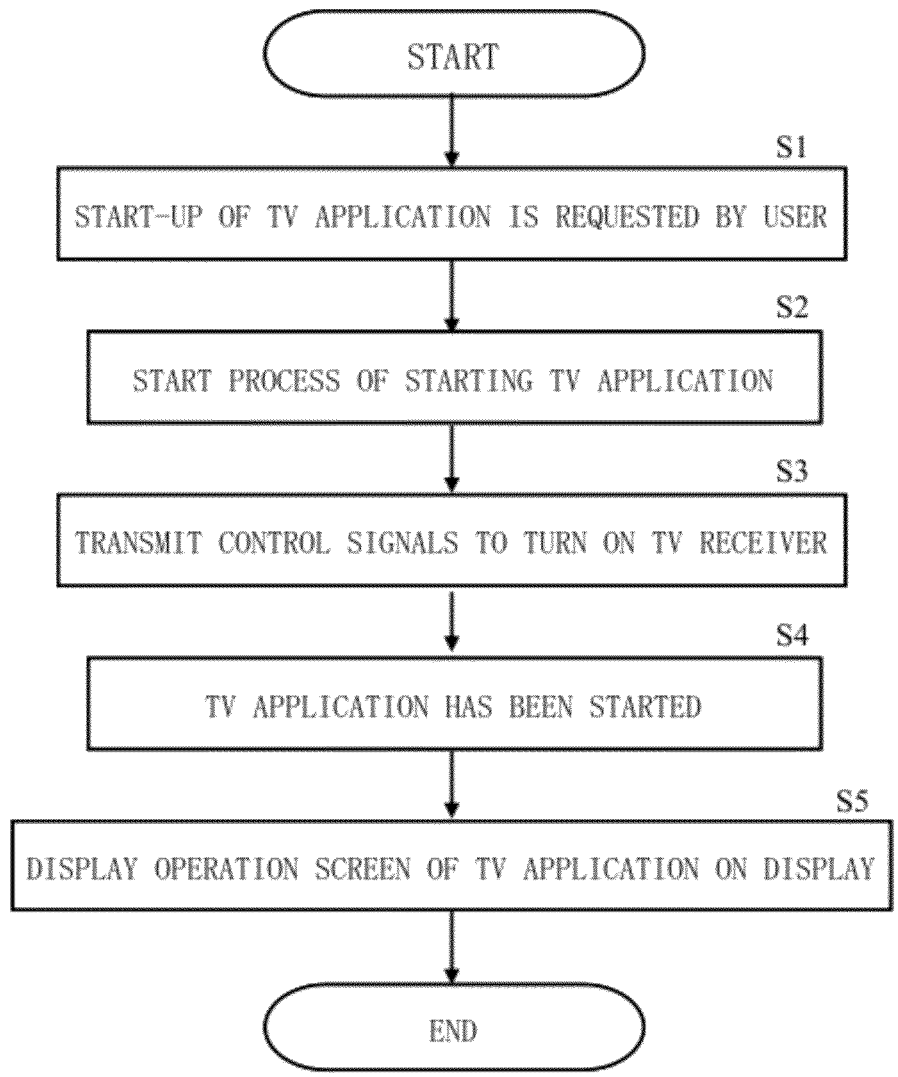
FIG. 5 is a flowchart showing the process of starting the TV application in the mobile device.

Referring now to the flowchart of FIG. 5, the process of starting the TV application 24a by the mobile device 2 is described in detail.

When the touch panel 21a is operated by a user to request start-up of the TV application 24a (S1), the main microprocessor 20 reads the TV application 24a from the memory 23 and starts the process of starting the TV application 24a (S2).

Subsequently, before the TV application 24a has been started, the main microprocessor 20 transmits, to the TV receiver 1, control signals to turn on the TV receiver 1 by using the wireless communication unit 22 (S3).

When the TV application 24a has been started (S4), the main microprocessor 20 displays the operation screen of the TV application 24a (see FIG. 4C) on the display 21 (S5). At this time, if the TV receiver 1 is on in the normal mode, a user can control the TV receiver 1 by operating the touch panel 21a.

Figure 6:
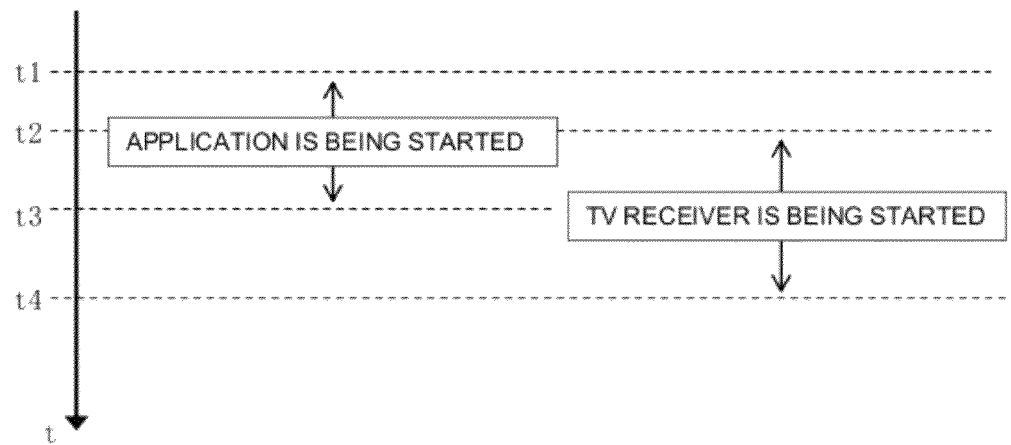
FIG. 6 is a timing diagram showing the operation of the mobile device when the TV application is started.
Figure 7:
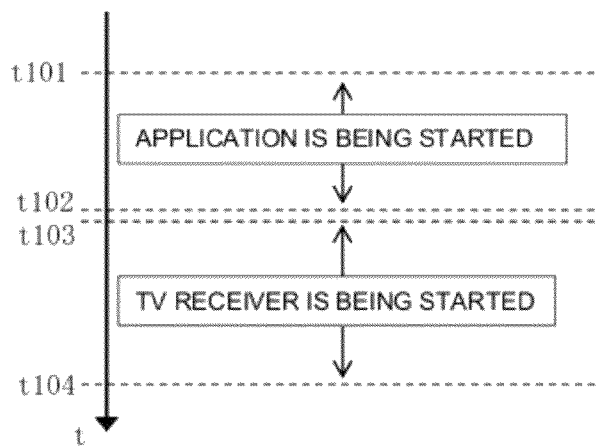
FIG. 7 is a timing diagram showing the operation of the conventional mobile device when the TV application is started.

Referring now to the timing diagram of FIG. 6, the operations of the TV receiver 1 and the mobile device 2 in the process of starting the TV application 24a are described. The t-axis in FIG. 6 is the time axis. In this case, assume that the TV receiver 1 is in the standby mode.

First, the main microprocessor 20 in the mobile device 2 starts the process of starting the TV application 24a (t1), and transmits to the TV receiver 1 control signals to turn on the TV receiver 1 before the TV application 24a has been started (t2). More particularly, the main microprocessor 20 in the mobile device 2 transmits control signals to turn on the TV receiver 1 while performing the process of starting the TV application 24a.

When the mobile device 2 has started the TV application 24a (t3) and the TV receiver 1 has been turned on in the normal mode (t4), a user can control the TV receiver 1 by using the mobile device 2.

As described above, in the mobile device 2 according to this embodiment, control signals to turn on the TV receiver 1 is transmitted to the TV receiver 1 before the TV application 24a has been started. Therefore, the TV receiver 1 can be turned on in the normal mode more quickly as compared to the case where the TV receiver 1 is instructed to be turned on after the TV application 24a has been started. This can reduce the waiting time from when the mobile device 2 has started the process of starting the TV application 24a until the TV receiver 1 can be controlled using the TV application 24a.

Further, the mobile device 2 transmits wireless signals including control signals to the TV receiver 1 via the nondirectional antenna 22a. Therefore, there is no need for a user to operate the mobile device 2 while pointing it at the TV receiver 1. Thus, the mobile device 2 can be easy to operate.

The present invention has been described above using a presently preferred embodiment, but those skilled in the art will appreciate that various modifications are possible. For example, the external device in claims is not limited to the TV receiver as described in the above embodiment but may be another external device that can be controlled based on an application in the mobile device.

Further, the mobile device and the TV receiver may transmit and receive wireless signals using Bluetooth that is omnidirectional.

This application is based on Japanese patent application 2011-103124 filed May 2, 2011, the contents of which are hereby incorporated by reference.

The invention claimed is:

1. A mobile terminal comprising:
   a signal transmission unit which transmits control signals to an external device;
   an operation unit for a user to perform various actions; and
   a microprocessor that starts a control application for control of the external device, and transmits, to the external device, an operation control signal based on remote control function of the control application, in response to a user action on the operation unit by using the signal transmission unit, wherein
   when starting the control application, the microprocessor transmits, to the external device, a turning-on control signal to turn on the external device by using the signal transmission unit before the process of starting the control application is completed.

2. The mobile terminal according to claim 1, wherein the external device is a television receiver.

3. The mobile terminal according to claim 2, wherein the control signals transmitted from the signal transmission unit are omnidirectional wireless signals.

4. The mobile terminal according to claim 1, wherein the control signals transmitted from the signal transmission unit are omnidirectional wireless signals.

* * * * *